Figure 1:
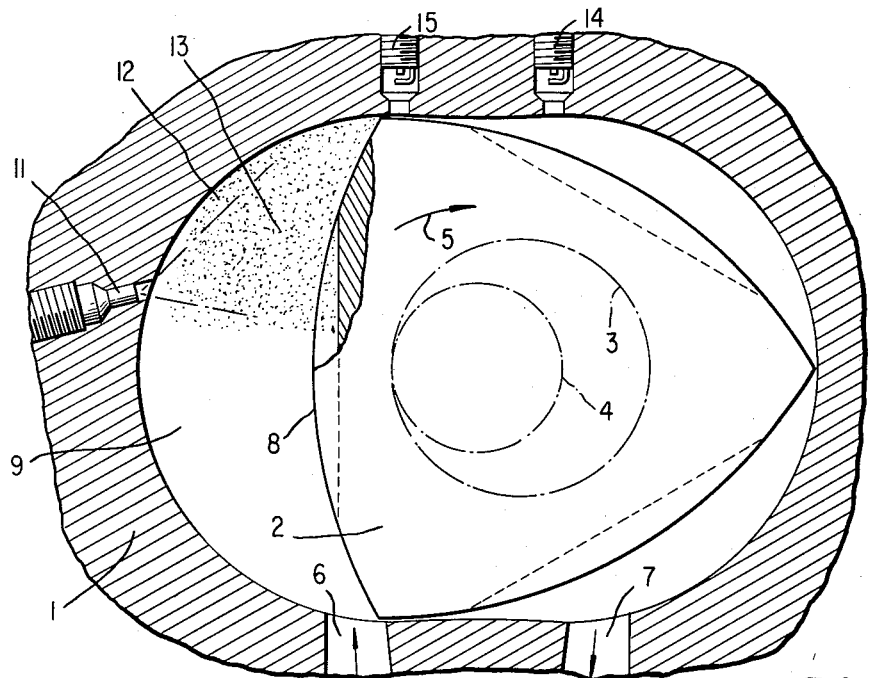

June 9, 1964     F. K. H. NALLINGER ETAL     3,136,302
ROTARY PISTON ENGINE
Filed March 20, 1961

INVENTORS
FRIEDRICH K.H. NALLINGER
WOLF-DIETER BENSINGER
BY Dicke, Craig & Freudenberg
ATTORNEYS United States Patent Office 3,136,302
Patented June 9, 1964

3,136,302
ROTARY PISTON ENGINE
Friedrich K. H. Nallinger, Stuttgart, and Wolf-Dieter Bensinger, Stuttgart-Unterturkheim, Germany, assignors to Daimler-Benz Aktiengesellschaft, Stuttgart-Unterturkheim, Germany
Filed Mar. 20, 1961, Ser. No. 96,979
Claims priority, application Germany Apr. 8, 1960
12 Claims. (Cl. 123—8)

The present invention relates to a rotary-piston engine with control means of the exchange of the charge by means of the rotary-piston, and is characterized by the fact that an injection nozzle is so inclined with respect to the housing wall in the construction of the engine as gas or mixture-compressing injection-type internal combustion engine that the injection nozzle injects in a circumferential direction of the rotary piston into the part of the suction space which adjoins the combustion space disposed within the area of the spark plug.

It is possible by the arrangement of the injection nozzle according to the present invention to achieve, without any special measures or expenditures, a stratification of lean and rich mixture within the combustion space, advantageous for the fuel consumption, in which the rich mixture is located at the instant of ignition within the area of the spark plug.

It is known that with rotary-piston engines the sucked-in combustion air is not subjected to any eddying motion or turbulence as would be the case with a reciprocating piston movement but instead is transferred in the same direction. The stratification into rich and lean mixture consisting of fuel and combustion air which is realized by the particular manner of the arrangement of the injection nozzle in accordance with the present invention remains, therefore, preserved from the suction space up to the combustion space so that the rich mixture is ignited by the spark plug and the lean mixture is ignited by the previously ignited rich mixture.

In order to assure a safe ignition of the rich mixture, it is proposed according to a further feature of the present invention to locate the spark plug advantageously in the part of the combustion space adjoining the expansion space.

Furthermore, for purposes of safe ignition of the practically exclusively rich mixture, existing under full-load operation and present in the relatively elongated combustion space, a second spark plug may be provided according to the present invention which is arranged in the part of the combustion space adjoining the suction space.

Accordingly, it is an object of the present invention to provide a rotary-piston internal combustion engine of the injection type in which good combustion processes are assured by simple, inexpensive and operationally reliable means.

Another object of the present invention resides in the provision of an injection system for an internal combustion engine which assures preservation of an advantageous stratification of rich and lean mixtures within the combustion space during partial load operation thereof.

Still another object of the present invention resides in the provision of a rotary-piston injection-type gasoline engine in which several zones are effectively produced containing, respectively, a rich and lean fuel-air mixture and which assures ignition of the rich mixture directly by the spark plug whereas the lean mixture is ignited only by the previously ignited rich mixture.

Still another object of the present invention resides in the provision of an injection-type rotary-piston gasoline or mixture compressing engine provided with injection means and with a particular arrangement of the spark plug means in such a manner as to assure proper operation of the engine with a high degree of efficiency, not only during full load, but also under partial load operations.

Figure 2:
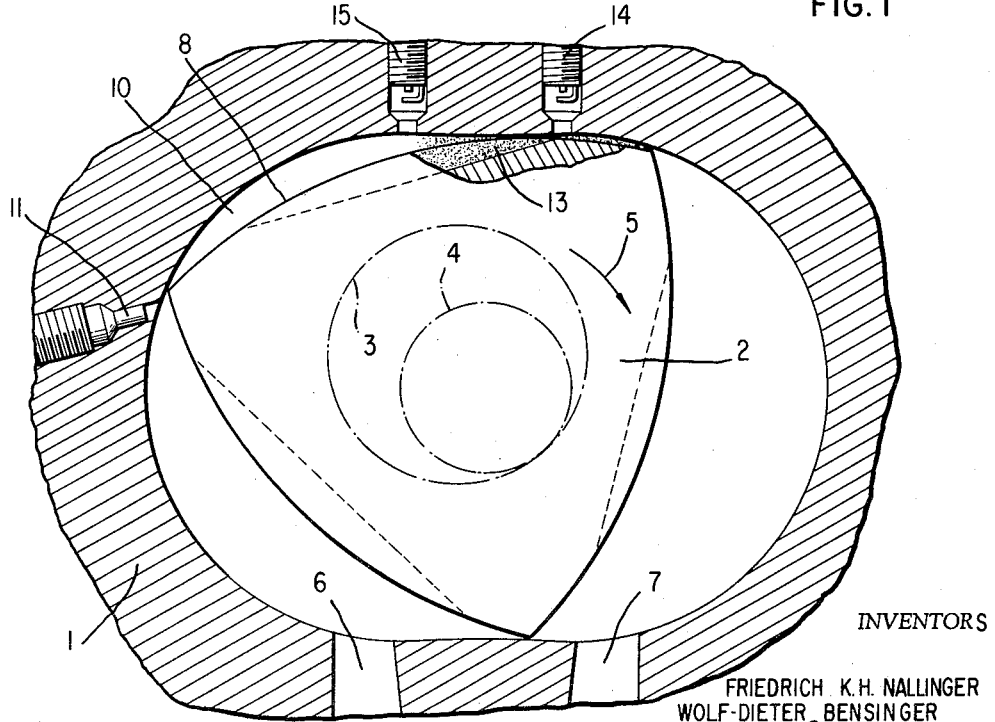

These and other objects, features and advantages of the present invention will become more obvious from the following description when taken in connection with the accompanying drawing which shows, for purposes of illustration only, one embodiment in accordance with the present invention, and wherein FIGURE 1 is a partial cross sectional view of a rotary piston injection-type gasoline engine provided with fuel injection means according to the present invention, and FIGURE 2 is a partial cross sectional view, similar to FIGURE 1, with the rotating piston in a different position from that occupied in FIGURE 1.

Referring now to the drawing in which like reference numerals are used throughout the two views to designate corresponding parts, the two figures thereof illustrate a known trochoidal rotary piston engine which comprises an essentially triangularly-shaped rotary piston 2 within the stationary housing 1. The rotary piston 2 rolls off in the direction of arrow 5 through the internal toothed arrangement 3, indicated only schematically, along a toothed gear 4 provided with external teeth and stationary with or non-rotatably secured in the housing 1. The movement of the rotary piston 2 is transmitted to the main shaft of the engine through an eccentric (not shown) which is concentric to the internal toothed arrangement 3 and supported within the rotary piston 2.

The inlet channel within housing 1 for the combustion air is designated by reference numeral 6 and the outlet channel for the exhaust gases by reference numeral 7.

If the rotary piston 2 is in the position thereof illustrated in FIGURE 1, then combustion air which is sucked in through the inlet channel 6 is present within the suction space 9 defined by the piston side or piston surface 8 and the housing 1. If now the rotary piston 2 moves from the position thereof indicated in FIGURE 1 further in the direction of arrow 5, then the rotary piston 2 closes off the inlet channel 6, thereupon compresses the combustion air and eventually supplies the same into the combustion space 10 shown in FIGURE 2 which is defined or limited by the same piston side 8 and the housing wall 1.

As may be readily seen from the drawing, the injection nozzle 11 provided for the supply of fuel is so inclined to the housing wall that it injects, in the rotary direction 5 of the rotating piston 2, into that part 12 of the suction space 9 (FIGURE 1) which is adjacent to the part of the combustion space 10 located within the area of the spark plug 13 when the rotary piston 2 is in the ignition position thereof illustrated in FIGURE 2. Since no eddying motion or turbulence is imparted to the drawn-in combustion air with a rotary piston engine, the rich mixture contained within the part 12 of the suction space 9 remains preserved within this space part as rich zone 13, indicated schematically by the stippling, as it is transferred or displaced during further movement of the rotary piston 2 over a short path so that the zone of the rich mixture 13, indicated by the stippling, finally comes to lie in front of the spark plug 14, as shown in FIGURE 2, when the rotary piston occupies the ignition position thereof. After the rich mixture is ignited by the spark plug 14, the rich mixture, in turn, ignites the remainder, relatively poor mixture present within the combustion space 10.

During full-load operation of the rotary piston engine in accordance with the present invention, essentially only rich mixture is present within the combustion space 10. In order to assure that this rich mixture is ignited safely notwithstanding the relatively elongated combustion space 10, a second spark plug 15 is provided adjacent the spark plug 14 whereby the spark plug 15 is arranged in the part of the combustion space 10 (FIGURE 2) adjoining the suction space 9 (FIGURE 1).

While we have shown and described one embodiment in accordance with the present invention, it is understood that the same is not limited thereto but is susceptible of many changes and modifications within the spirit and scope thereof and we, therefore, do not wish to be limited to the details shown and described herein but intend to cover all such changes and modifications as are encompassed by the scope of the appended claims.

We claim:

1. A rotary piston engine adapted to operate as injection-type mixture-compressing engine, comprising housing wall means provided with inlet means and outlet means, polygonal piston means within said housing wall means, means for rotating said polygonal piston means relative to said housing wall means to effectively provide, during rotation of said piston means, a suction space followed by a combustion space in the direction of rotation of said piston means and to control the opening and closing of said inlet means and outlet means directly by the rotary movements of said polygonal piston means, spark plug means in said housing wall means within the area thereof said combustion space, and injection means including injection nozzle means so inclined to said housing wall means that it injects essentially in the direction of rotation of said piston means in to that part of the suction space which is disposed adjacent to the combustion space located within the area of the spark plug means.

2. A rotary piston engine adapted to operate as injection-type mixture-compressing engine, comprising housing wall means provided with inlet means and outlet means, polygonal piston means within said housing wall means, means for rotating said polygonal piston means relative to said housing wall means to effectively provide, during rotation of said piston means, a suction space followed by a combustion space in the direction of rotation of said piston means and to control the opening and closing of said inlet means and outlet means directly by the rotary movements of said polygonal piston means, spark plug means in said housing wall means within the area thereof of said combustion space, and injection means including injection nozzle means so inclined to said housing wall means that it injects essentially in the direction of rotation of said piston means into that part of the suction space which is disposed adjacent to the combustion space located within the area of the spark plug means, said spark plug means being arranged within the part of said combustion space adjoining the expansion space.

3. A rotary piston engine adapted to operate as injection-type mixture-compressing engine, comprising housing wall means provided with inlet means and outlet means, polygonal piston means within said housing wall means, means for rotating said polygonal piston means relative to said housing wall means to effectively provide, during rotation of said piston means, a suction space followed by a combustion space in the direction of rotation of said piston means and to control the opening and closing of said inlet means and outlet means directly by the rotary movements of said polygonal piston means, spark plug means in said housing wall means within the area thereof of said combustion space, and injection means including injection nozzle means so inclined to said housing wall means that it injects essentially in the direction of rotation of said piston means into that part of the suction space which is disposed adjacent to the combustion space located within the area of the spark plug means, said spark plug means including two spark plugs, one of said spark plugs being arranged within the part of said combustion space adjoining the expansion space and another one of said spark plugs being arranged within the part of said combustion space adjoining the suction space.

4. A rotary piston engine provided with externally controlled auto-ignition means, comprising housing wall means, polygonal piston means rotatable within said housing wall means, inlet means in said housing wall means, outlet means in said housing wall means, means for rotating said polygonal piston means relative to said housing wall means to effectively provide upon rotation of said piston means a suction space, a combustion space and an expansion space effectively following and adjoining one another in the direction of rotation of said piston means, and fuel injection means for injecting substantially only fuel including injection nozzle means so inclined with respect to said housing wall means as to provide a fuel jet directed essentially in the direction of rotation of said piston means and into that part of the suction space which is disposed adjacent the combustion space.

5. A rotary piston engine, comprising housing wall means, polygonal piston means rotatably disposed within said housing wall means, inlet and outlet means within said housing wall means for the admission of combustion air and the discharge of exhaust gases, respectively, means for rotating said polygonal piston means relative to said housing wall means so as to control the opening and closing of said inlet and outlet means directly by the rotary movements of said polygonal piston means and also effectively providing between said piston means and said housing wall means a suction space followed by a combustion space in the direction of rotation of said polygonal piston means, and fuel injection means for injecting substantially only fuel in the direction of rotation of the piston means into that part of the suction space which is disposed adjacent the combustion space.

6. A rotary piston engine of the type in which the rotating piston effectively forms with the walls of the engine housing a suction space followed by a combustion space followed by an expansion space, comprising housing wall means, spark plug means in said wall means within the area thereof effectively forming part of the combustion space, piston means within said wall means, inlet and outlet means within said housing wall means, means for rotating said piston means relative to said housing wall means to effectively provide, during rotation of said piston means, said suction space followed by said combustion space in turn followed by said expansion space and to control also the opening and closing of said inlet and outlet means directly by the rotary movements of said piston means, and injection means injecting substantially only fuel in the direction of rotation of the piston means into that part of the suction space which is disposed adjacent the combustion space, said piston means being of polygonal shape, and said spark plug means including two spark plugs, one of said spark plugs being located within the region of the combustion space neighboring the suction space and another spark plug being located within the region of the combustion space neighboring the expansion space.

7. A rotary piston engine in which the inlet cross section of the inlet channel for the admission of the combustion air and the discharge cross section of the outlet channel for the exhaust gases are controlled by the rotary piston itself and adapted to operate as injection-type gasoline engine, comprising wall means, spark plug means in said wall means, polygonal piston means within said wall means, means for rotating said polygonal piston means relative to said wall means in a predetermined manner to effect control of said inlet and discharge cross sections and effectively providing between said wall means and said piston means, during rotation of said piston means, a suction space followed by a combustion space in the direction of rotation of said polygonal piston means, and injection means for injecting substantially only fuel including injection nozzle means so inclined to said housing wall means as to inject in the direction of rotation of the piston means into that part of the suction space which is disposed adjacent the combustion space and located within the area of said spark plug means.

8. In an injection-type rotary-piston engine in which the admission of combustion air through the inlet duct and the discharge of exhaust gases through the outlet duct are controlled by the rotary piston itself, and which includes housing wall means, polygonal rotary piston means adapted to rotate within said housing wall means, and means for rotating said polygonal piston means relative to said housing wall means in such a manner as to effectively provide therebetween, during rotation of said piston means, a suction space followed by a combustion space in the direction of rotation of said piston means and effecting said combustion air and exhaust gases control by the rotary movements of said piston means, the improvement essentially consisting of fuel injection means for injecting substantially only fuel into the suction space in such a manner as to enable preservation of the rich and lean mixture stratification as the mixture is transferred from the suction space into the combustion space during rotation of said piston means.

9. In an injection-type rotary-piston engine of trochoidal construction which includes an engine housing provided with internal surfaces and with inlet and outlet means in the housing walls thereof for the admission of combustion air and discharge of exhaust gases, respectively, a polygonal piston having piston flanks and rotatably arranged within said housing, means for rotating said polygonal piston relative to said housing in such a manner that the piston corners slide along said internal surfaces to effectively provide, during rotation of the piston, between the piston flanks and said surfaces a suction space followed by a combustion space in the direction of rotation of the piston and the polygonal piston also directly controls in effect the admission of combustion air through said inlet means and the discharge of exhaust gases through said outlet means, and spark plug means in said housing walls within the area thereof forming part of said combustion space, the improvement essentially consisting of fuel injection means in the walls of said engine for injecting fuel into said suction space to produce a stratification of rich and lean mixture which is transferred from the suction space to the combustion space upon rotation of said piston.

10. In an injection-type rotary-piston engine of trochoidal construction which includes an engine housing provided with internal surfaces and with inlet and outlet means in the housing walls thereof for the admission of combustion air and discharge of exhaust gases, respectively, a polygonal piston having piston flanks and rotatably arranged within said housing, means for rotating said polygonal piston relative to said housing in such a manner that the piston corners slide along said internal surfaces to effectively provide, during rotation of the piston, between the piston flanks and said surfaces a suction space followed by a combustion space in the direction of rotation of the piston and the polygonal piston also directly controls in effect the admission of combustion air through said inlet means and the discharge of exhaust gases through said outlet means, and spark plug means in said housing walls within the area thereof forming part of said combustion space, the improvement essentially consisting of fuel injection means in the walls of said engine for injecting fuel into said suction space to produce a stratification of rich and lean mixture which is transferred from the suction space to the combustion space upon rotation of said piston including nozzle means so inclined to the housing walls that the fuel is injected into that part of the suction space which is adjacent to that part of the combustion space located within the area of said spark plug means.

11. In an injection-type rotary-piston engine of trochoidal construction which includes an engine housing provided with internal surfaces and with inlet and outlet means in the housing walls thereof for the admission of combustion air and discharge of exhaust gases, respectively, a polygonal piston having piston flanks and rotatably arranged within said housing, means for rotating said polygonal piston relative to said housing in such a manner that the piston corners slide along said internal surfaces to effectively provide, during rotation of the piston, between the piston flanks and said surfaces a suction space followed by a combustion space in the direction of rotation of the piston and the polygonal piston also directly controls in effect the admission of combustion air through said inlet means and the discharge of exhaust gases through said outlet means, and spark plug means in said housing walls within the area thereof forming part of said combustion space, the improvement essentially consisting of fuel injection means in the walls of said engine for injecting fuel into said suction space to produce a stratification of rich and lean mixture which is transferred from the suction space to the combustion space upon rotation of said piston including nozzle means so inclined to the housing walls that the fuel is injected into that part of the suction space which is adjacent to that part of the combustion space located within the area of said spark plug means, said spark plug means including two spark plugs disposed one behind the other in the direction of rotation of the piston in said last-mentioned area.

12. In an injection-type rotary-piston engine of trochoidal construction which includes an engine housing provided with internal surfaces and with inlet and outlet means in the housing walls thereof for the admission of combustion air and discharge of exhaust gases, respectively, a polygonal piston having piston flanks and rotatably arranged within said housing, means for rotating said polygonal piston relative to said housing in such a manner that the piston corners slide along said internal surfaces to effectively provide, during rotation of the piston, between the piston flanks and said surfaces a suction space followed by a combustion space in turn followed by an expansion space in the direction of rotation of the piston and the polygonal piston also directly controls in effect the admission of combustion air through said inlet means and the discharge of exhaust gases through said outlet means, and spark plug means in said housing walls within the area thereof forming part of said combustion space.

the improvement essentially consisting of fuel injection means in the walls of said engine for injecting fuel into said suction space to produce a stratification of rich and lean mixture which is transferred from the suction space to the combustion space upon rotation of said piston including nozzle means so inclined to the housing walls that the fuel is injected into that part of the suction space which is adjacent to that part of the combustion space located within the area of said spark plug means, said spark plug means including two spark plugs disposed one behind the other in the direction of rotation of the piston in said last-mentioned area.

References Cited in the file of this patent
FOREIGN PATENTS
593,434     Canada _____ Mar. 1, 1960